(12) United States Patent
Greer et al.

(10) Patent No.: US 6,782,057 B2
(45) Date of Patent: Aug. 24, 2004

(54) VERY HIGH-SPEED DIGITAL RF CLIPPER/MODULATOR

(75) Inventors: Michael Greer, Hollywood, FL (US); Nadeem Khan, Satellite Town (PK)

(73) Assignee: XG Technology, LLC, Sarasota, FL (US)

(*) Notice: Subject to any disclaimer, the term of this patent is extended or adjusted under 35 U.S.C. 154(b) by 0 days.

(21) Appl. No.: 10/321,412

(22) Filed: Dec. 17, 2002

(65) Prior Publication Data

US 2003/0112892 A1 Jun. 19, 2003

Related U.S. Application Data

(60) Provisional application No. 60/341,929, filed on Dec. 19, 2001.

(51) Int. Cl.[7] .............................. H03C 5/00; H04L 27/02
(52) U.S. Cl. ........................................ 375/268; 375/300
(58) Field of Search ................................. 375/259–285, 375/300; 327/172; 341/69; 330/10; 361/21.07; 323/288; 324/142

(56) References Cited

U.S. PATENT DOCUMENTS

| | | | |
|---|---|---|---|
| 3,863,025 A | 1/1975 | Gonsewski et al. | |
| 3,899,741 A * | 8/1975 | Brandt et al. ............... | 329/301 |
| 4,055,803 A * | 10/1977 | Kraley et al. ............... | 324/142 |
| 4,201,942 A | 5/1980 | Downer | |
| 5,677,927 A | 10/1997 | Fullerton et al. | |
| 6,542,015 B2 * | 4/2003 | Zhou et al. .................. | 327/172 |

* cited by examiner

Primary Examiner—Stephen Chin
Assistant Examiner—Curtis Odom
(74) Attorney, Agent, or Firm—Dennis L. Cook, Esq.

(57) ABSTRACT

The present invention is addressed to a method of modulation wherein digital data streams are radio transmitted at a high level of efficiency and speed, and without a large continuous concomitant formation of side frequency phenomena. Thus, bandwidths assigned for this transmissional task are quite narrow, with data transmission speeds at the singular frequency of the RF carrier itself. This invention can send high-speed data in RF channels that are very narrow and that would ordinarily be considered useful only for very low speed data or analog voice. The purpose of this invention is to provide a means by which a radio frequency carrier, expressed, as a square wave can be amplitude modulated with maximum efficiency and speed with minimum phase delay and distortion. RF filtering is used to reduce the modulated square wave to its base band sine wave component after modulation. This circuit may be used to modulate the carrier (clock) at any frequency up to and beyond the carrier frequency itself. This is useful in the implementation of broadband wireless systems. This invention can also be used with multiple access systems.

8 Claims, 4 Drawing Sheets

VERY HIGH-SPEED DIGITAL RF CLIPPER/MODULATOR

CROSS-REFERENCE TO RELATED APPLICATION

The present application claims the benefit of previously filed co-pending Provisional Patent Application Serial No. 60/341,929, filed Dec. 19, 2001.

FIELD OF THE INVENTION

This invention relates, generally, to methods for wireless transmission of data, and more specifically, to a carrier modulation method and system by which a radio frequency carrier, expressed, as a square wave can be amplitude modulated with maximum efficiency and speed with minimum phase delay and distortion. RF filtering is used to reduce the modulated square wave to its base band sine wave component after modulation. This modulation method and system may be used to modulate the carrier (clock) at any frequency up to and beyond the carrier frequency itself. This is useful in the implementation of broadband wireless systems.

BACKGROUND OF THE INVENTION

Radio transmission of information traditionally involves employing electromagnetic waves or radio waves as a carrier. Where the carrier is transmitted as a sequence of fully duplicated wave cycles or wavelets, no information is considered to be transmissible. To convey information, historically, the carrier has superimposed on it a sequence of changes that can be detected at a receiving point or station. The changes imposed correspond with the information to be transmitted, and are known in the art as "modulation".

Where the amplitude of the carrier is changed in accordance with information to be conveyed, the carrier is said to be amplitude modulated (AM). Similarly, where the frequency of the carrier is changed in accordance with information to be conveyed, either rarified or compressed wave cycles are developed, and the carrier is said to be frequency modulated (FM), or in some applications, it is considered to be phase modulated. Where the carrier is altered by interruption corresponding with information, it is said to be pulse modulated.

Currently, essentially all forms of the radio transmission of information are carried out with amplitude modulation, frequency modulation, pulse modulation or combinations of one or more. All such forms of modulation have inherent inefficiencies. For instance, a one KHz audio AM modulation of a Radio Frequency (RF) carrier operating at one MHz will have a carrier utilization ratio of only 1:1000. A similar carrier utilization occurs with corresponding FM modulation. Also, for all forms of currently employed carrier modulation, frequencies higher and lower than the frequency of the RF carrier are produced. Since they are distributed over a finite portion of the spectrum on each side of the carrier frequency, they are called side frequencies and are referred to collectively as sidebands. These sidebands contain all the message information and it has been considered that without them, no message can be transmitted. Sidebands, in effect, represent a distribution of power or energy from the carrier and their necessary development has lead to the allocation of frequencies in terms of bandwidths by governmental entities in allocating user permits within the radio spectrum. This necessarily limits the number of potential users for a given RF range of the spectrum.

To solve the bandwidth crisis in the RF Spectrum, multiple access systems were developed. Multiple Access Systems are useful when more than one user tries to transmit information over the same medium. The use of multiple access systems is more pronounced in Cellular telephony; however, they are also used in data transmission and TV transmission. There are three common multiple access systems. They are as follows:

1—Frequency Division Multiple Access (FDMA)
2—Time Division Multiple Access (TDMA)
3—Code Division Multiple Access (CDMA)

FDMA is used for standard analog cellular systems. Each user is assigned a discrete slice of the RF spectrum. FDMA permits only one user per channel since it allows the user to use the channel 100% of the time. FDMA is used in the current Analog Mobile Phone System (AMPS).

In a TDMA system the users are still assigned a discrete slice of RF spectrum, but multiple users now share that RF carrier on a time slot basis. A user is assigned a particular time slot in a carrier and can only send or receive information at those times. This is true whether or not the other time slots are being used. Information flow is not continuous for any user, but rather is sent and received in "bursts". The bursts are re-assembled to provide continuous information. Because the process is fast, TDMA is used in IS-54 Digital Cellular Standard and in Global Satellite Mobile Communication (GSM) in Europe. In large systems, the assignments to the time/frequency slots cannot be unique. Slots must be reused to cover large service areas.

CDMA is the basis of the IS-95 digital cellular standard. CDMA does not break up the signal into time or frequency slots. Each user in CDMA is assigned a Pseudo-Noise (PN) code to modulate transmitted data. The PN code is a long random string of ones and zeros. Because the codes are nearly random there is very little correlation between different codes. The distinct codes can be transmitted over the same time and same frequencies, and signals can be decoded at the receiver by correlating the received signal with each PN code.

The great attraction of CDMA technology from the beginning has been the promise of extraordinary capacity increases over narrowband multiple access wireless technology. The problem with CDMA is that the power that the mobiles are required to transmit goes to infinity as the capacity peak is reached. i.e. the mobiles will be asked to transmit more than their capacity allows. The practical consequence of this is that the system load should really be controlled so that the planned service area never experiences coverage failure because of this phenomenon. Thus CDMA is a tradeoff between maximum capacity and maximum coverage.

Over the previous few decades, electronically derived information has taken the form of binary formatted data streams. These data streams are, for the most part, transmitted through telecommunication systems, i.e., wire. Binary industry communication in general commenced with the networking of computer facilities in the mid 1960s. An early networking architecture was referred to as "Arpanet". A short time later, Telenet, the first public packet-switched network, was introduced to commerce. As these networks grew, protocols for their use developed. For example, a coding protocol, ASCII (American Standard Code for Information Interchange) was introduced in 1964. Next, Local Area Networks (LAN) proliferated during the 1970s, the oldest and most prominent, Ethernet, having been developed by Metcalfe in 1973. Under the Ethernet concept, each station of a local system connects by cable to a transceiver and these transceivers are then inter-linked. In 1983, the Institute of Electrical and Electronic Engineers (IEEE) promulgated Ethernet with some modifications, as the first standard protocol for Local Area Networks. The Ethernet protocol remains a standard for essentially all forms of database conveyance or exchange.

While binary data stream transmission by wire has improved substantially in terms of data transfer rates, that improvement has not been the case where transmission is by utilization of the RF spectrum. Current technology in data stream transmission by wire is shown in U.S. Pat. No. 5,661,373 titled Binary digital signal transmission system using binary digital signal of electrically discharged pulse and method for transmitting binary digital signal and issued Aug. 26, 1997 to Nishizawa, which discloses a binary digital signal transmission system wherein a transmitter generates a binary digital signal including at least a rise portion where a level of the binary digital signal steeply rises in accordance with inputted binary digital data of a first value, and at least a fall portion where the level of the binary digital signal steeply falls in accordance with the inputted binary digital data of a second value, and then transmits the binary digital signal via a cable to a receiver. On the other hand, the receiver receives the transmitted binary digital signal, and first and second resonance circuits respectively have two resonance frequencies which are even multiples of each other, and extract first and second resonance signals respectively having resonance frequency components of the two resonance frequencies, from the received binary digital signal. Thereafter, a data discriminator discriminates a value of the binary digital data corresponding to the received binary digital signal based on a phase relationship between the extracted first and second resonance signals, and outputs either one of a pulse signal representing the first value and another pulse signal representing the second value.

Carrier Frequency modulators are currently used in transmitting data over wireless systems. This invention is an improvement in carrier modulation circuitry by which a radio frequency carrier, expressed, as a square wave can be amplitude modulated with maximum efficiency and speed with minimum phase delay and distortion. RF filtering is used to reduce the modulated square wave to its base band sine wave component after modulation. This circuit may be used to modulate the carrier (clock) at any frequency up to and beyond the carrier frequency itself. This is useful in the implementation of broadband wireless systems.

Currently the techniques used for Amplitude Modulation (AM) are the following:

1—Double side band (DSB) Suppress Carrier (SC) Modulation
2—Double side band (DSB) with Carrier (DSB+C) Modulation
3—Single side band (SSB) Modulation
4—Quadrature Amplitude (QAM) Modulation
5—Vestigial Sideband (VSB) Modulation The AM techniques listed above use the following different kinds of modulators more completely described below:

1—Product Modulators or Multiplier Modulators
2—Non Linear Modulators or Square-Law Modulators
3—Balanced Modulators
4—Switching Modulators
5—Selective filtering modulators for SSB
6—Phase shift modulators for SSB
7—QAM modulators
8—Vestigial Sideband Modulators Product or Multiplier Modulators. This type of modulator is used in DSB-SC modulation and DSB+C modulation. For DSB-SC technique, modulation is performed directly by multiplying the modulating signal m(t) with local oscillator (LO) using an analog multiplier whose output is proportional to the product of two input signals. A block diagram for this type of modulator is shown in FIG. 1. In DSB+C system a large carrier is also transmitted with the suppressed carrier modulated signal thus eliminating the need to generate a local carrier at the receiver. This is so called Amplitude Modulation (AM). The block diagram for this type of modulator is shown in FIG. 2. The block diagram in FIG. 2 can be implemented with an analog multiplier and an operational amplifier. Analog Multiplication can be carried out electronically in a number of different ways. One popular integrated circuit design is the variable transconductance amplifier as shown in FIG. 3. Other circuits achieve multiplication directly with Hall-effect devices or indirectly with log and antilog amplifiers. However, most analog multipliers are limited to low power levels and relatively low frequencies.

Non Linear or Square-Law modulator. The Square-Law modulator also known as Non Linear modulator can accomplish signal multiplication at higher frequencies. The block diagram for such type of modulator is shown in FIG. 4. The circuit realization of the above block diagram uses JFET transistor as the non linear element and a parallel RLC circuit as a filter. Diodes are also used as non linear elements. Unfortunately, perfect square-law devices are rare, so high frequency DSB is obtained in practice using two AM modulators arranged in a balanced configuration to cancel out the carrier. Such balanced modulators are explained next.

Balanced Modulators. The carrier (or LO) can be suppressed or nearly eliminated by using a balanced modulator or an extremely sharp filter. The basic principle of any balanced modulator is to introduce the carrier in such a way that only the sidebands appear at the output. The balanced modulator circuit chosen by a designer depends on constructional considerations, cost and the active devices to be employed. In any balanced-modulator circuit, there is theoretically no output when no signal is applied. When signal is applied, the balance is upset and one branch conducts more than the other. Since any modulation process is the same as "mixing", sum and difference frequencies (sidebands) are generated. The modulator is not balanced for the sidebands, and they appear at the output. A block diagram of a balanced modulator is shown in FIG. 5. For perfect suppression of the carrier, both modulators should be matched as closely as possible. The balanced modulators are somewhat difficult to design.

Switching Modulator. In view of heavy filtering required, square law modulators are used primarily for low-level modulation, i.e. at power levels lower than the transmitted value. Substantial linear amplification is then necessary to bring the power up to average power transmitted. But RF power amplifiers of the required linearity have their own problems and it is often better to employ high-level modulation if average transmitted power is large. Efficient high-level modulators are arranged so that the undesired modulation products never fully develop and need not be filtered out. This is usually accomplished with the help of a switching device. Examples of switching modulators are shunt-bridge diode modulators, series-bridge diode modulators, and ring modulators.

Selective filtering modulator for SSB. This is the most commonly used method of generating SSB signals. In this method, a DSB-SC signal is passed through a sharp cutoff filter to eliminate the undesired sideband. This process is usually accomplished in two stages. In the first step baseband signal DSB-modulates a low frequency carrier $f_1$. The unwanted sideband is then suppressed because the ratio of the gap band to the carrier is reasonably high. After suppression of the unwanted sideband, the resulting spectrum is identical to the baseband spectrum except that the band gap is now 2 $f_1$. In the second step this signal (with large band gap) DSB-modulates a carrier of high frequency $f_2$. The unwanted sideband is again suppressed because of the large gap band. If the carrier frequency is too high, the process may have to be repeated. A block diagram for this process is shown in FIG. 6. The disadvantage of this sort of system is that if the carrier frequency is too high the process may have to be repeated several times to achieve the desired results. Also filters should have a very sharp cutoff, which is usually achieved by adding more and more filter stages.

Phase Shift modulator for SSB. This method bypasses the need for sideband filters. Instead, the DSB sidebands are phased such that they cancel out on one side of the carrier frequency and add on the other side to create a single-sideband output. A block diagram for this system is shown in FIG. 7. The Quadrature phase shifter is itself a very complicated network and can only be approximated. Approximation imperfections generally cause low-frequency signal distortion. Another method of generating SSB is Weaver's SSB modulator. Weaver's SSB avoids both sideband filters and Quadrature phase shifters but it uses two Local Oscillators at different frequencies and two Low Pass filters.

Quadrature Amplitude modulators. DSB signals occupy twice the bandwidth required for SSB signals. This disadvantage can be overcome by transmitting two DSB signals using carriers of the same frequency but in phase Quadrature. Both modulated signals occupy the same bandwidth. The two baseband signals can be separated at the receiver by synchronous detection using two local carriers in phase Quadrature. This principle of Quadrature carrier multiplexing is the basis of Quadrature Amplitude modulation. FIG. 8 depicts the functional block of binary QAM transmitter with a polar binary input at rate $r_b$. The modulating signal X(t) is passed through a serial to parallel converter. The serial to parallel converter divides the input X(t) into two streams consisting of alternate bits at rate r=$r_b$/2. The signals coming out of the serial to parallel converter [$X_i(t)$ and $X_q(t)$] are multiplied by the 90 degrees out of phase local oscillator and then summed together. The two-dimension signal constellation is shown in FIG. 9. The four signal points have been labeled with the corresponding pairs of source bits, known as dibits.

Quadrature multiplexing is used in color television to multiplex the so-called chrominance signals, which carry the information about the colors. These synchronizing pulses are transmitted to keep the local oscillator at the right frequency and phase. QAM is also used in digital transmission. QAM spectra actually extend beyond the estimated transmission bandwidth. Such spectral "spillover" outside transmission bandwidth becomes an important concern in radio transmission and frequency division multiplexing systems when it creates interference with other signal channels. Bandpass filtering at the output of the modulator controls spillover, but very heavy filtering introduces Intersymbol Interference (ISI) in the modulated signal and should be avoided. Spectral efficiency without spillover is achieved by the Vestigial sideband (VSB) modulator explained below.

Vestigial Sideband (VSB) Modulator. A vestigial sideband system is a compromise between DSB and SSB. It inherits the advantages of DSB and SSB but avoids their disadvantages. VSB signals are relatively easy to generate, and, at the same time their bandwidth is only slightly (typically 25%) greater than that of SSB signals. In VSB, instead of rejecting one sideband completely (as in SSB), a gradual cutoff of one sideband is accepted. The roll-off characteristic of the filter is such that the partial suppression of the transmitted sideband in the neighborhood of the carrier is exactly compensated for by the partial transmission of the corresponding part of the suppressed sideband. Because of this spectral shaping, the baseband signal can be recovered exactly by the synchronous detector. If a large carrier is transmitted along with the VSB signal, the baseband signal can be recovered by an envelope (or a rectifier) detector. VSB can be generated from DSB signal using relatively simple filters with gradual roll-off characteristics. Its immunity to selective fading is comparable to that of SSB. Also, if a sufficiently large carrier is added, the resulting signal (VSB+C) can be demodulated by an envelop detector with relatively small distortion. All these properties of VSB make it attractive for commercial television Even in light of improvements made in non wireless digital data transmissions and modulators for wireless transmissions the transmission inefficiencies occasioned with the modulation of an RF carrier have remained to the extent that an efficient, high-speed transmission of binary information utilizing an RF carrier remains as an elusive goal of those skilled in the art.

BRIEF SUMMARY OF THE INVENTION

The present invention is addressed to a modulator wherein digital data streams are radio transmitted at a high level of efficiency and speed, and without a large continuous concomitant formation of side frequency phenomena. Thus, bandwidths assigned for this transmissional task are quite narrow, with data transmission speeds at the singular frequency of the RF carrier itself. This invention can send high-speed data in RF channels that are very narrow and that would ordinarily be considered useful only for very low speed data or analog voice. The purpose of this invention is to provide a method and system by which a radio frequency carrier, expressed, as a square wave can be amplitude modulated with maximum efficiency and speed with minimum phase delay and distortion. RF filtering is used to reduce the modulated square wave to its base band sine wave component after modulation. This method and system may be used to modulate the carrier (clock) at any frequency up to and beyond the carrier frequency itself. This is useful in the implementation of broadband wireless systems. This invention can also be used with multiple access systems.

In patent application Ser. No. 09/916,065 filed by Nadeem Khan (a co-inventor of this patent application), the contents of which are incorporated herein, a new method of carrier modulation referred to as "Suppressed cycle modulation" (SCM) was disclosed. That method of modulation uses an RF carrier comprised of a continuum of full cycle sinusoidal wavelets extending between zero crossover points or positions, and that carrier is then amplitude modulated to carry binary information by selectively suppressing one or a succession of carrier wavelets. Such suppression may be assigned to represent either a binary one or zero value. The suppressional modulation is carried out by amplitude suppression of data related wavelets at the sinusoidal zero crossing positions defining them.

Inasmuch as these zero positions correspond with the absence of electromagnetic wave energy, no wave disturbances are invoked which, would in turn, produce side frequencies. As a consequence, the assigned carrier frequencies may be quite close together in value to provide a substantially improved utilization of the radio spectrum for binary data transmittal.

The purpose of the present invention is to provide a method and system by which a radio frequency carrier, expressed, as a square wave can be amplitude modulated, for example suppressed cycle modulated, with maximum efficiency and speed with minimum phase delay and distortion. RF filtering is used to reduce the modulated square wave to its base band sine wave component after modulation. This method and system may be used to modulate the carrier (clock) at any frequency up to and beyond the carrier frequency itself. This is useful in the implementation of broadband wireless systems.

This type of modulation method and system offers the following advantages:

a) It performs as a clipper and as a modulator.
b) It is made up of passive components and no active components are involved.
c) This sort of clipper/modulator method and system is independent of the signal frequency so it is a very wide band system.
d) It is fast, cheap and simple.
e) Percentage of modulation is simply controlled and is independent of the signal frequency.
f) It is a low noise modulation method and system.

The modulation method and system could be easily modified by those skilled in the art to implement this invention using compatible multiple access systems.

The invention accordingly, comprises the modulation method and system which is exemplified in the following detailed description.

For a fuller understanding of the nature and objects of the invention, reference should be made to the following detailed description taken in connection with the accompanying drawings.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

The wireless transmission of digital binary data streams in accordance with the instant invention is the concept of "suppressed cycle modulation" (SCM) wherein sinusoidal-defining wavelets on a RF carrier, each with a period representing 360°, are selectively amplitude suppressed to represent a select binary value. For example, the suppression of such a wavelet, or sequence of them, from an otherwise continuous carrier sequence of wavelets defining a carrier waveform may represent either a logic zero or logic one depending upon the protocol utilized. Because these wavelets are selectively suppressed by acting upon the carrier waveform at zero crossing positions, minimal side frequencies or sidebands are generated. These sidebands occur for only one RF cycle and the power contained in the sideband is very low. The RF signal and method of the invention can perform with a very narrowly allocated bandwidth that approaches the unmodulated carrier width itself. Thus, bandwidths assigned for this transmissional task are quite narrow, with data transmission speeds at the singular frequency of the RF carrier itself. This invention can send high-speed data in RF channels that are very narrow and that would ordinarily be considered useful only for very low speed data or analog voice. The purpose of this invention is to provide a means by which a radio frequency carrier, expressed, as a square wave can be amplitude modulated with maximum efficiency and speed with minimum phase delay and distortion. RF filtering is used to reduce the modulated square wave to its base band sine wave component after modulation. This method and system may be used to modulate the carrier (clock) at any frequency up to and beyond the carrier frequency itself. This is useful in the implementation of broadband wireless systems. This invention can also be used with multiple access systems.

Figure 1:
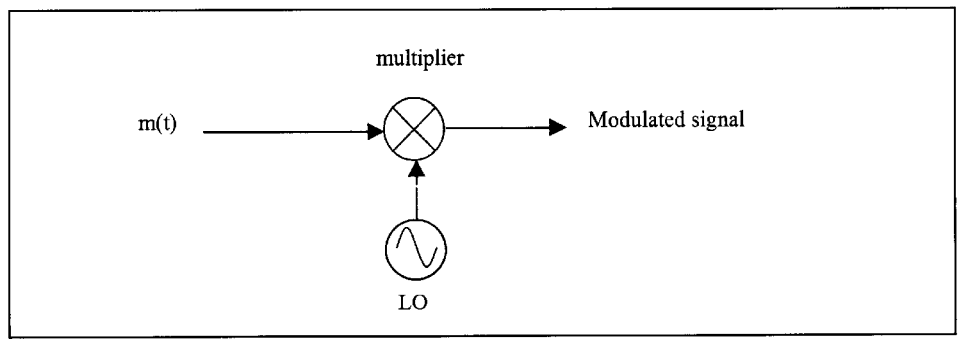
FIG. 1 Prior art Product or Multiplier Modulators.
Figure 2:
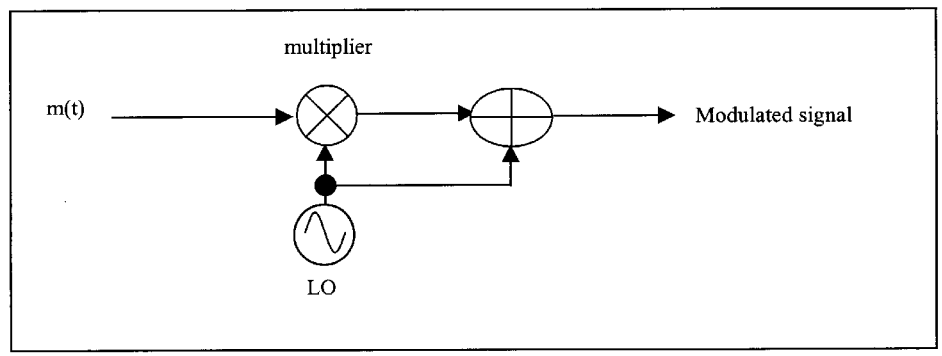
FIG. 2 Prior art Product or Multiplier Modulators for DSB+C system Amplitude Modulation.
Figure 3:
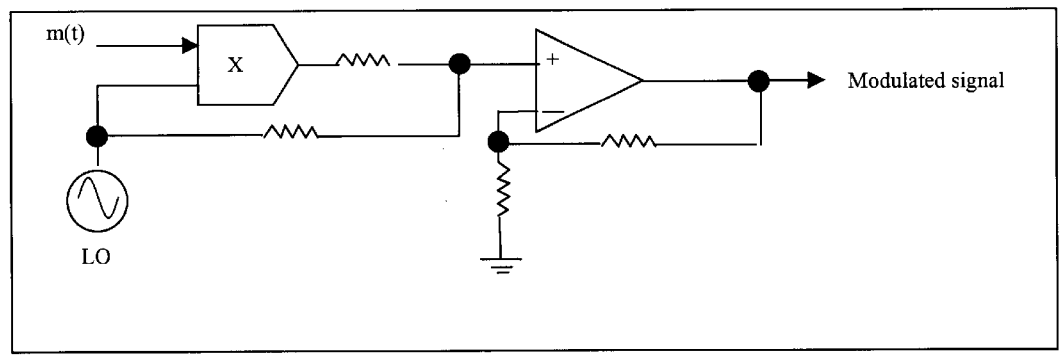
FIG. 3 Prior art Analog Multiplication Modulator.
Figure 4:
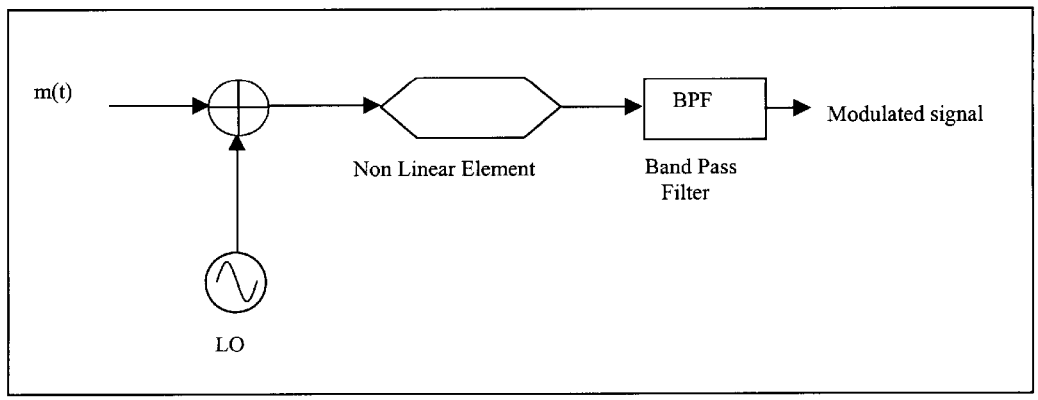
FIG. 4 Prior art Non Linear or Square-Law modulator.
Figure 5:
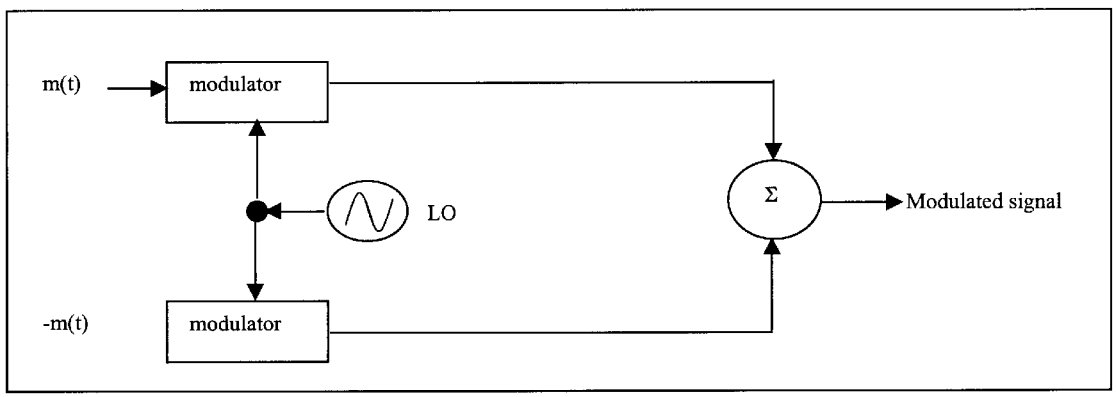
FIG. 5 Prior art Balanced Modulators.
Figure 6:
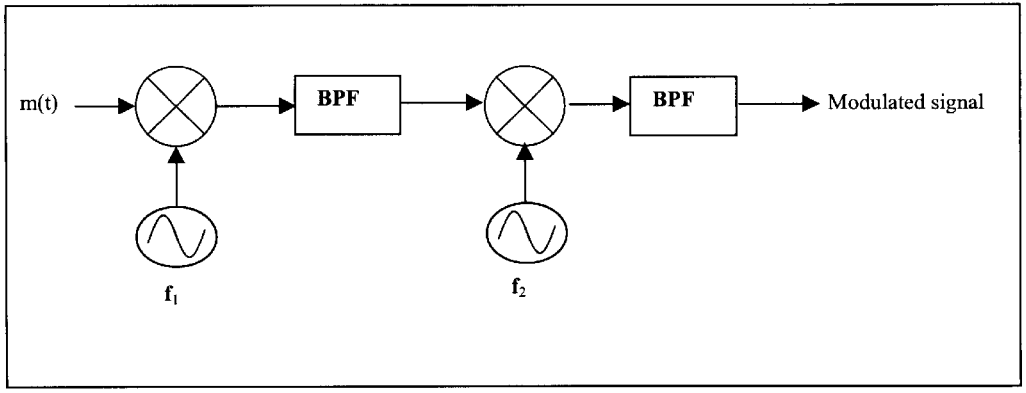
FIG. 6 Prior art Selective filtering modulator for SSB
Figure 7:
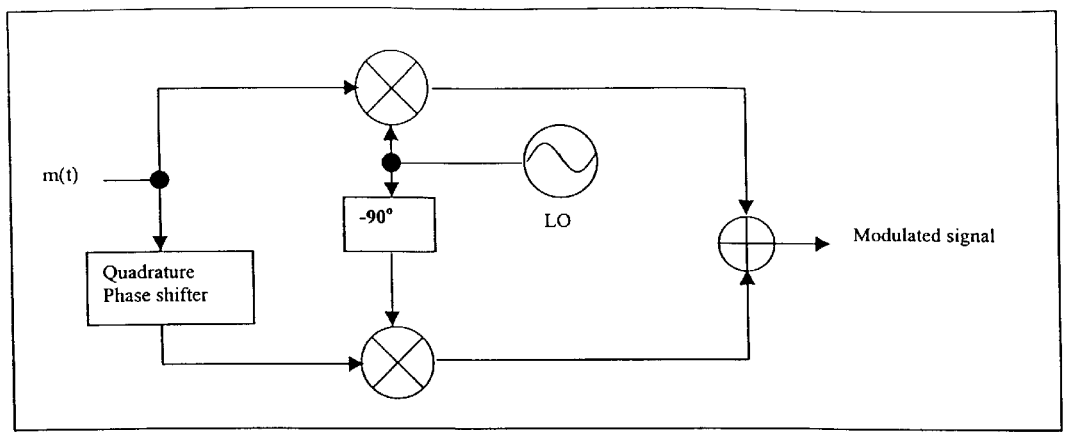
FIG. 7 Prior art Phase Shift modulator for SSB.
Figure 8:
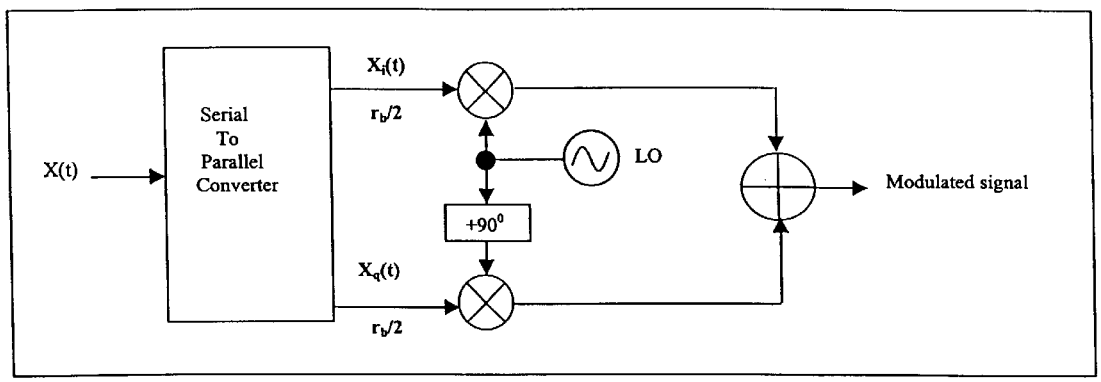
FIG. 8 Prior art Quadrature Amplitude modulators.
Figure 9:
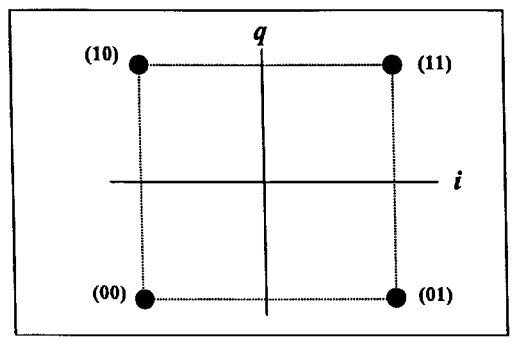
FIG. 9 Prior art two-dimension signal constellation.
Figure 10:
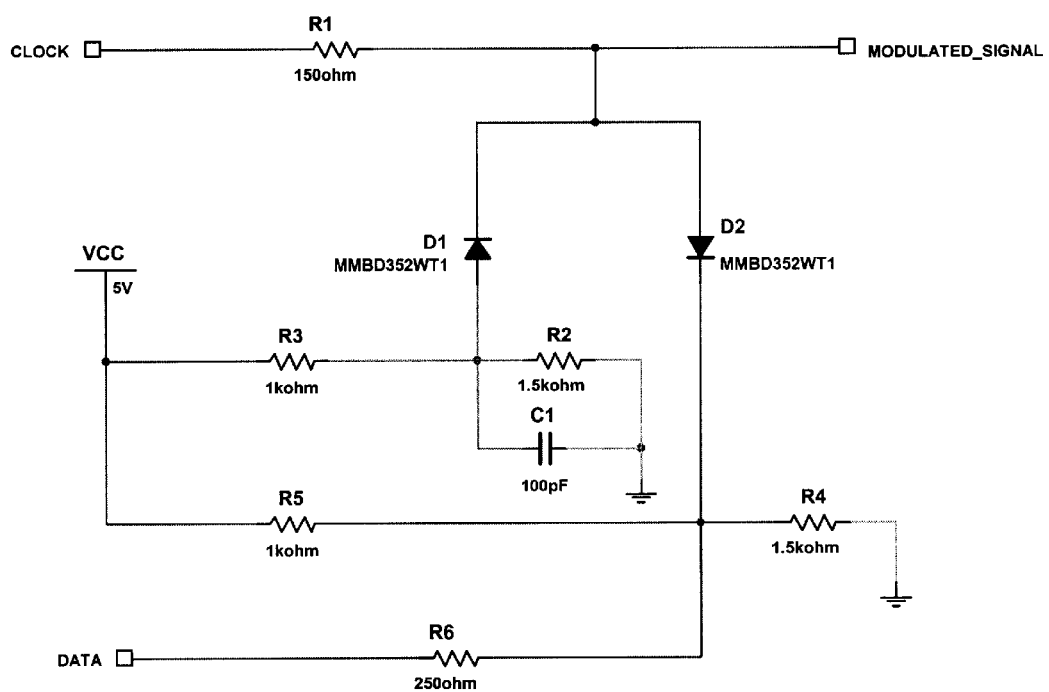
FIG. 10 Clipper/Modulator circuitry.

The preferred embodiment of the Clipper/Modulator method and system circuitry is shown in the schematic FIG. 10. The inputs to this circuit are Clock (CLK) and DATA. This Clock is TTL (Transistor Transistor Logic) and is running at the fundamental frequency of the transmitter comprising a base band modulator. However those skilled in the art will recognize that the derived modulated signal, after RF filtering, could also be used in heterodyning systems that are at some other frequency. The DATA is NRZ (Non-Return-to-Zero) and is synchronized with the Clock.

The TTL Clock coming into the circuit is varying from 0 to 5 volts but the duty cycle at this amplitude is not 50%. However the duty cycle is approximately 50% for small variations in the Clock level (i.e. the duty cycle is 50% for a Clock level varying from 1 volt to 3 volts) so the clipper circuitry is added for this purpose. In the schematic of FIG. 10 R1, R2, R3, R4, R5 D1, and D2 form the clipper circuitry but other clipping methods and circuitry are well known to those skilled in the art and could be used to perform the clipping function. The diodes (D1 and D2) used in the circuit are high-speed Schottky Barrier Diodes. The resistor R6 controls the percentage of modulation and capacitor C1 is for signal smoothing. Other percentage of modulation circuits and smoothing circuits are also able to be used to implement the system and method of the invention and are well known by those skilled in the art. The clipped Clock is modulated by the DATA as follows.

To get to a 50% duty cycle CLK the Clock (running at 0 volts to 5 volts) is clipped from 1 volt to 3 volts. Resistors R2 and R3 form a voltage divider and are used to set the lower clip level at 1 volt. Resistors R4 and R5 form another voltage divider network and are used to set the higher clip level at 3 volts.

Resistor R6 controls the percentage of modulation. R6 can be a variable resistor but in the preferred embodiment R6 has a fixed resistance of 250 ohms. R6 is connected in series with the DATA and to the junction of R4 and R5. The DATA is in NRZ format varying from 0 to 5 volts.

When DATA is high (e.g. binary "1"), the modulation resistor R6 becomes parallel with R5 and the higher clipper level is set by R4 and the parallel combination of R5 and R6. When Data is low (e.g. binary "0"), the modulation resistor R6 becomes parallel with R4 and the higher clipper level is now set by R5 and the parallel combination of R4 and R6. Thus the CLK signal is modulated with the lower level set by the lower clipping level and the higher level varying with the highs and lows of the DATA signal. Capacitor C1, located between the junction of R2 and R3 and ground, is used for signal smoothing. RF filtering (not shown) well known to those skilled in the art is then applied to the modulated CLK signal to reduce the modulated square wave to its base band sine wave component for transmission as a Suppressed Cycle Modulated waveform.

Because of the above-mentioned inherent advantages, this method and system creating SCM RF transmissions, when used in conjunction with FDMA or TDMA, guarantees high-speed data transmission to multiple simultaneous users.

When used in FDMA mode, each user is assigned a particular carrier frequency to transmit/receive their information. Therefore, since the bandwidth requirement for a channel to transmit (or receive) high-speed data is low, hundreds or thousands of channels can be accommodated within a narrow spectral band. Thus using this modulation method and system to create SCM RF transmissions in FDMA mode, allows the user to use the channel 100% of the time.

When used in TDMA mode, multiple users share the common frequency band and they are required to transmit their information at different time slots within the carrier. Data is transmitted and received in bursts. These bursts are reassembled at the receiver (or base station) to provide continuous information. Since the data transmission speed is the same as the carrier speed in SCM transmissions using the modulation system and method of this invention, this process of transmitting/receiving bursts of data appears continuous.

Like CDMA, the SCM method using the modulation method and system of this invention has negligible interference from adjacent channels. But, CDMA performance decreases as the system approaches its capacity (i.e., as the number of users increase, each user must transmit more power). This creates a coverage problem for CDMA. Thus, CDMA requires a tradeoff between maximum capacity and maximum coverage. The SCM system performance does not decrease with an increase in the number of users in a multiple access system. This is because when the SCM system, using the disclosed modulation method and system, is used in FDMA mode, each user will have its own carrier, and when the SCM system, using the disclosed modulation method and system, is used in TDMA mode, each user is allowed to transmit/receive in its particular time slot only. Thus capacity and coverage problems using the modulation method and system of this invention with Suppressed Cycle Modulation are negligible.

Since certain changes may be made in the above described modulation method and system without departing from the scope of the invention herein involved, it is intended that all matter contained in the description thereof or shown in the accompanying drawings shall be interpreted as illustrative and not in a limiting sense.

What is claimed is:

1. A method of modulating a radio frequency carrier capable of transmitting a binary information stream made up of first and second binary states comprising:

generating a clock signal operating at the fundamental frequency of a carrier frequency to be modulated;

clipping said clock signal sufficient to achieve a fifty percent duty cycle resulting in a clipped squarewave clock signal;

modulating the clipped squarewave clock signal by the binary information stream by having the lower level of said clipped squarewave clock signal set by the lower clipped level and the higher clipped level of the clipped squarewave clock signal vary with the first and second binary states of the binary information stream creating a modulated clipped squarewave clock signal;

smoothing said modulated clipped squarewave clock signal; and, filtering said modulated clipped squarewave clock signal to its base band sine wave component resulting in a modulated carrier frequency signal having an integer number of wavelets suppressed to be transmitted.

2. The method of claim 1 wherein:

the generation of said clock signal is accomplished by a local oscillator having an oscillator output at a select carrier frequency.

3. The method of claim 1 further comprising:

broadcasting said modulated carrier frequency signal by using a Time Division Multiple Access system.

4. The method of claim 1 further comprising:

broadcasting said modulated carrier frequency signal by using a Frequency Division Multiple Access system.

5. A system for modulating a radio frequency carrier capable of transmitting a binary information stream made up of first and second binary states comprising:

a clock signal generating means operating at the fundamental frequency of a carrier frequency to be modulated;

a clipping means for clipping said clock signal sufficient to achieve a fifty percent duty cycle resulting in a clipped squarewave clock signal;

a modulating means for modulating the clipped squarewave clock signal by the binary information stream by having the lower level of said clipped squarewave clock signal set by the lower clipped level and the higher clipped level of the clipped squarewave clock signal vary with the first and second binary states of the binary information stream creating a modulated clipped squarewave clock signal;

a smoothing means for smoothing said modulated clipped squarewave clock signal; and, a filtering means for filtering said modulated clipped squarewave clock signal to its base band sine wave component resulting in a modulated carrier frequency signal having an integer number of wavelets suppressed to be transmitted.

6. The system of claim 5 wherein:

said generating means of said clock signal is a local oscillator having an oscillator output at a select carrier frequency.

7. The method of claim 5 further comprising:

a broadcasting means for broadcasting said modulated carrier frequency signal by using a Time Division Multiple Access system.

8. The method of claim 5 further comprising:

a broadcasting means for broadcasting said modulated carrier frequency signal by using a Frequency Division Multiple Access system.

* * * * *